US008854597B2

(12) United States Patent
Sharma et al.

(10) Patent No.: US 8,854,597 B2
(45) Date of Patent: Oct. 7, 2014

(54) WAVELENGTH SELECTIVE SWITCH (75) Inventors: Manish Sharma, Morgan Hill, CA (US); Gil Cohen, Livingston, NJ (US)

(73) Assignee: Finisar Corporation, Sunnyvale, CA (US)

( * ) Notice: Subject to any disclaimer, the term of this patent is extended or adjusted under 35 U.S.C. 154(b) by 96 days.

(21) Appl. No.: 13/418,497

(22) Filed: Mar. 13, 2012

(65) Prior Publication Data

US 2012/0236216 A1 Sep. 20, 2012

Related U.S. Application Data (60) Provisional application No. 61/453,524, filed on Mar. 16, 2011.

(51) Int. Cl.
*G02F 1/13* (2006.01)
*G02B 26/02* (2006.01)
*G02B 6/35* (2006.01)

(52) U.S. Cl.
CPC .............. *G02B 26/02* (2013.01); *G02B 6/3556* (2013.01); *G02B 6/3512* (2013.01); *G02B 6/356* (2013.01); *G02B 6/3542* (2013.01)
USPC ................. 349/202; 349/9; 349/196; 385/18; 385/37

(58) Field of Classification Search
USPC ...................... 349/1, 8, 9, 196, 197, 201, 202; 359/298, 223.1; 356/326; 385/18, 11, 385/16, 24, 37; 398/79
See application file for complete search history.

(56) References Cited

U.S. PATENT DOCUMENTS

| 5,414,540 | A | 5/1995 | Patel et al. |
| 6,097,859 | A * | 8/2000 | Solgaard et al. ................ 385/17 |
| 6,285,500 | B1 | 9/2001 | Ranalli et al. |
| 6,327,019 | B1 | 12/2001 | Patel et al. |
| 6,694,073 | B2 * | 2/2004 | Golub et al. .................... 385/18 |
| 6,819,823 | B2 | 11/2004 | Solgaard et al. |
| 7,106,966 | B1 * | 9/2006 | Lalonde et al. ................ 398/46 |
| 7,330,615 | B2 | 2/2008 | McGuire, Jr. |
| 7,558,447 | B2 * | 7/2009 | Suh et al. ........................ 385/16 |
| 7,702,194 | B2 | 4/2010 | Presley et al. |
| 7,769,255 | B2 | 8/2010 | Nagy et al. |
| 7,822,303 | B2 | 10/2010 | Cohen et al. |

(Continued)

FOREIGN PATENT DOCUMENTS

| WO | WO 03/032071 | 4/2003 |
| WO | WO 2005/052507 | 6/2005 |

(Continued)

OTHER PUBLICATIONS

PCT/US2012/029074 International Search Report (Jun. 27, 2012).

*Primary Examiner* — Thoi Duong
(74) *Attorney, Agent, or Firm* — Kurt Rauschenbach; Rauschenbach Patent Law Group, LLC (57) ABSTRACT

An optical switching device has multiple input ports and multiple output ports and is capable of switching a wavelength component from any of the input ports to any of the output ports. The optical switching device is configured with beam steering arrays that are controlled to provide the switching from any of the input ports to any of the output ports. The beam steering arrays may be microelectromechanical (MEMS) mirror arrays or liquid-crystal on silicon (LCOS) panels. In addition, an array of beam-polarizing liquid-crystal elements provides wavelength-independent attenuation.

22 Claims, 9 Drawing Sheets (56) References Cited

U.S. PATENT DOCUMENTS

2005/0094930 A1  5/2005  Stone
2008/0219663 A1* 9/2008  Yuan et al. .................. 398/48
2009/0220233 A1  9/2009  Presley et al.
2009/0231580 A1  9/2009  Nagy et al.

FOREIGN PATENT DOCUMENTS

| WO | WO 2006/123344 | 11/2006 |
| WO | WO 2007/029260 | 3/2007 |
| WO | WO 2010/146589 A1 | 12/2010 |

* cited by examiner

WAVELENGTH SELECTIVE SWITCH

CROSS-REFERENCE TO RELATED APPLICATION(S)

This application claims the benefit of U.S. Provisional Patent Application Ser. No. 61/453,524, filed Mar. 16, 2011, which is incorporated by reference herein.

BACKGROUND OF THE INVENTION

1. Field of the Invention

Embodiments of the present invention relate generally to optical communication systems and components and, more particularly, to a wavelength selective switch.

2. Description of the Related Art

In a wavelength division multiplexing (WDM) optical communication system, information is carried by multiple channels, each channel having a unique wavelength. WDM allows transmission of data from different sources over the same fiber optic link simultaneously, since each data source is assigned a dedicated wavelength component, or channel. The result is an optical communication link with an aggregate bandwidth that increases with the number of wavelengths, or channels, incorporated into the WDM signal. In this way, WDM technology maximizes the use of an available fiber optic infrastructure; what would normally require multiple optic links or fibers instead requires only one.

In WDM optical communication systems, it is often necessary to add, drop, or attenuate individual wavelength channels in a WDM signal. These functions can be achieved by an optical switching device, which directs an input light beam to one of multiple output optical paths. For example, in a 1×2 optical switching device, an input light beam enters through one input fiber and is directed to one of two output fibers. All optical energy of the input beam may be directed to a single output fiber or a portion of the optical energy may be directed to each output fiber, depending on the purpose of the optical switching device, i.e., simple switching vs. broadcasting or attenuation/equalization. The input light beam so directed may be a complete WDM optical signal or an individual wavelength channel of a WDM optical signal. An optical switch configured to perform such optical switching on a per wavelength channel basis is referred to as a wavelength selective switch (WSS), and is typically capable of switching any wavelength channel at the input fiber to either of the output fibers.

More complicated optical switching schemes than 1×2 switching are also commonly used in optical communication systems, such as 1×N switching, which can be realized by configuring multiple 1×2 switching devices in series and/or in parallel, or by incorporating 1×N functionality into a single optical switching device. Similarly, optical switching devices that are configured to switch each of the wavelength channels of multiple input fibers to any of the N output fibers can be constructed from a plurality 1×N devices. 1×N optical switching devices for WDM communication systems are, however, quite complex, and include active and passive optical elements that must be manufactured and aligned to high tolerances for proper operation. Consequently, producing such as device by arraying a plurality of 1×N optical switching devices is generally undesirable.

SUMMARY OF THE INVENTION

One or more embodiments of the present invention provide an optical switching device that has multiple input ports and multiple output ports and is capable of switching a wavelength component from any of the input ports to any of the output ports. In some embodiments, a wavelength selective switch is provided that is configured with beam steering arrays that are controlled to switch a wavelength component from any of the input ports to any of the output ports. The beam steering arrays may be microelectromechanical (MEMS) mirror arrays or liquid-crystal on silicon (LCOS) panels, or any other type of beam steering array such as DLP or LC panels. In addition, an array of beam-polarizing liquid-crystal elements provides wavelength-independent attenuation, if required.

An optical device, according to an embodiment of the present invention, includes a light diffracting element positioned in an optical path of optical signals transmitted through input ports to separate the optical signals into wavelength components, and first and second arrays of independently controlled beam steering elements. Each beam steering element of the first array is independently controlled to direct one of the wavelength components to a selected one of the beam steering elements of the second array, and each beam steering element of the second array is independently controlled to direct the wavelength component incident thereon to a selected output port, via a wavelength-combining grating element.

An optical device, according to another embodiment of the present invention, includes a light diffracting element positioned in an optical path of optical signals transmitted through input ports to separate the optical signals into wavelength components, first and second arrays of independently controlled beam steering elements, and a light combining element positioned between the first and second arrays of independently controlled beam steering elements to combine the wavelength components from the first array of independently controlled beam steering elements into a plurality of output signals. Each beam steering element of the first array is independently controlled to direct one of the wavelength components to the light combining element, and each beam steering element of the second array is independently controlled to direct one or more of the output signals to a selected output port.

An optical device, according to still another embodiment of the present invention, includes a light diffracting element positioned in an optical path of optical signals transmitted through input ports to separate the optical signals incident on a light dispersive side thereof into wavelength components, and first and second arrays of independently controlled beam steering elements. Each beam steering element of the first array is independently controlled to direct one of the wavelength components to a selected one of the beam steering elements of the second array, and each beam steering element of the second array is independently controlled to direct the wavelength component incident thereon to a light combining side of the light diffracting element, from which the combined optical signals are coupled into a number of different output ports.

An optical device, according to still yet another embodiment of the present invention, includes a reflective light diffracting element positioned in an optical path of optical signals transmitted through input ports to separate the optical signals into wavelength components and in an optical path of the wavelength components reflected from a array of independently controlled beam steering elements to combine the wavelength components into one or more optical signals, each output through a different output port. The array of independently controlled beam steering elements is positioned to reflect the wavelength components from the reflective light diffracting element back to the reflective light diffracting element, each beam steering element of the array being independently controlled to direct a wavelength component incident thereon to the reflective light diffracting element so as to be combined with other wavelength components and output through a selected output port.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
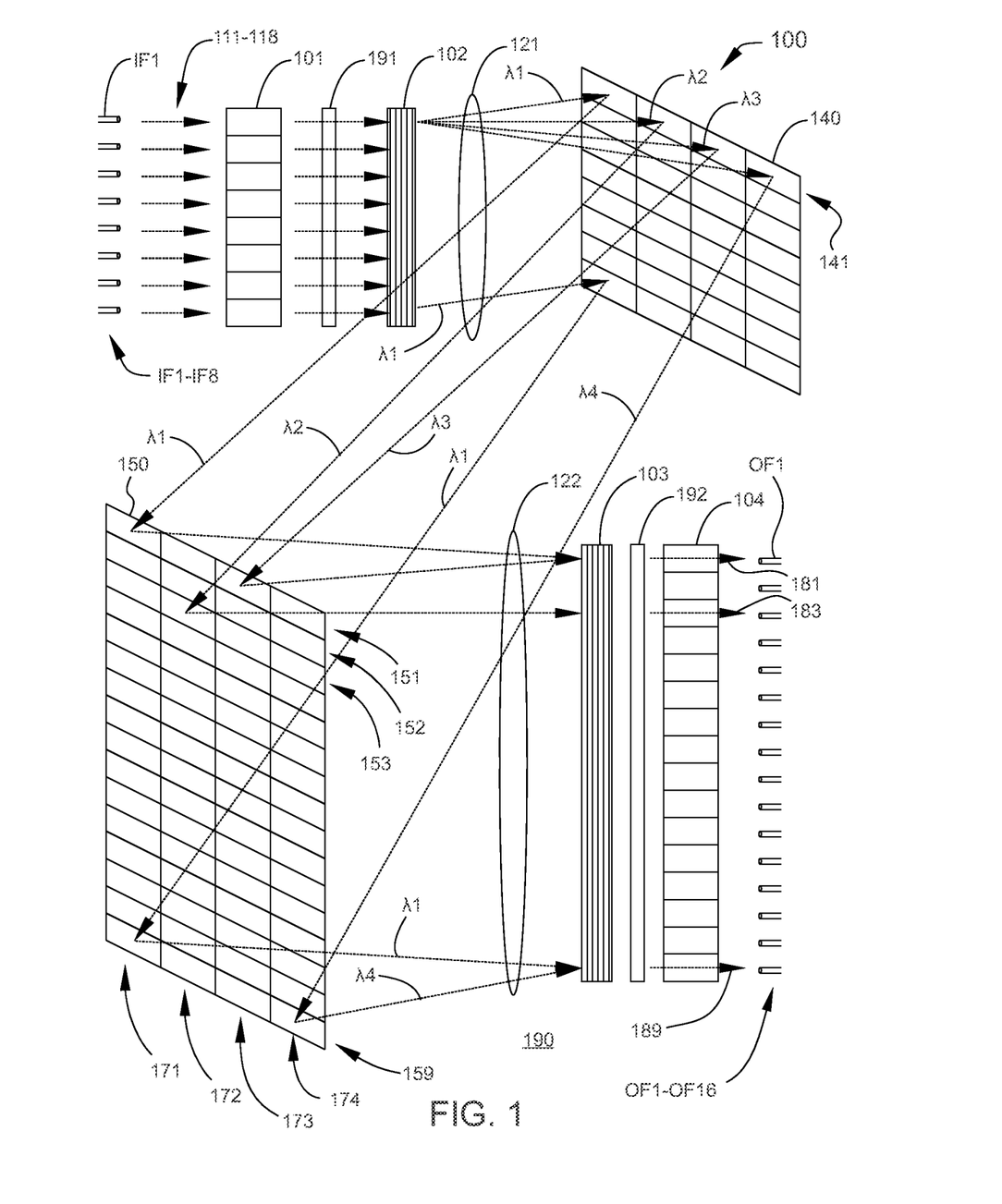
FIG. 1 schematically illustrates a perspective view of a wavelength selective switch (WSS) with M×N wavelength-independent switching capability, according to an embodiment of the invention.

FIG. 1 schematically illustrates a perspective view of a wavelength selective switch (WSS) 100 with M×N wavelength-independent switching capability, according to an embodiment of the invention. WSS 100 is configured to provide wavelength-independent switching for each of the k wavelength components propagating through each of M input fibers to any of N output fibers. In the illustrative embodiment illustrated in FIG. 1, WSS 100 is configured for wavelength-independent switching of the k wavelength components in each of eight input fibers IF1-IF8 to any of 16 output fibers OF1-OF16. One of skill in the art, upon reading the disclosure herein, can readily devise other configurations of WSS, such as a 16×16 WSS, a 16×8 WSS, etc. Input beams 111-118 are independent WDM optical signals that contain a plurality of wavelength components, propagate from input fibers IF1-IF8, respectively, and are each optically coupled to WSS 100. For clarity, the number of wavelength components, k, for each of input beams 111-118 is four in the embodiment illustrated in FIG. 1. In practice, k is typically a substantially larger number, e.g., 48, 96, 128, etc., in keeping with the wavelength-component-carrying capacity of current WDM systems. One of skill in the art will appreciate that novel features of the invention described herein can be easily scaled for embodiments of a WSS in which k=128 or more wavelength components.

WSS 100 includes an array of input collimators 101, a demultiplexer 102, a first reflective beam-steering array 140, a second reflective beam-steering array 150, a multiplexer 103, coupling optics 121, 122, and an array of output collimators 104. The components of WSS 100 are mounted on a planar surface 190 that is herein defined as the horizontal plane for purposes of description only. Other orientations of planar surface 190 also fall within the scope of the invention. In the embodiment illustrated in FIG. 1, WSS 100 performs wavelength separation of wavelength components in the horizontal plane and performs switching selection of wavelength components between input fibers IF1-IF8 and output fibers OF1-OF16 in the vertical plane as described below.

Input collimators 101 include input ports that are optically coupled to input fibers IF1-IF8. Input collimators 101 direct incoming light beams, i.e., input beams 111-118, to demultiplexer 102 along a desired optical path. Specifically, input collimators 101 receive diverging light rays from input fibers IF1-IF8 and set these rays parallel to one another so as to form collimated light beams from each of input fibers IF1-IF8. Thus, input beams 111-118 are substantially parallel to each other when leaving input collimators 101, and are incident on demultiplexer 102 at a desired angle for demultiplexing of said beams.

Demultiplexer 102 is a light diffracting element, may be a diffraction grating, an arrayed waveguide grating (AWG), or other optical demultiplexing device known in the art, and is configured to spatially separate the wavelength components of each of input beams 111-118, so that each wavelength component is directed along a unique optical path. Suitable diffraction gratings include reflective or transmissive diffraction gratings. In FIG. 1, demultiplexer 102 is depicted as a transmissive diffraction grating. For clarity, only the wavelength components λ1-λ4 of input beam 111 are shown as they propagate through WSS 100. Demultiplexer 102 is oriented such that each of wavelength components λ1-λ4 is optically coupled to a dedicated reflective beam-steering element of first reflective beam-steering array 140.

First reflective beam-steering array 140 includes a plurality of reflective beam-steering elements configured to direct incident wavelength components from demultiplexer 102 to second beam-steering array 150. In the embodiment illustrated in FIG. 1, first reflective beam-steering array 140 is a rectangular array of reflective beam-steering elements, where each horizontal row of elements is positioned to receive the individual wavelength components of one of input beams 111-118, i.e., a top row 141 receives wavelength components λ1-λ4 from input beam 111, a second row 142 receives wavelength components (not shown) from input beam 112, and so on. Thus, in the embodiment illustrated in FIG. 1, first reflective beam-steering array 140 is configured as an array of four columns and eight rows of beam-steering elements, one column corresponding to each of the wavelength components λ1-λ4 and one row corresponding to each of input beams 111-118. In some embodiments, the individual beam-steering elements of first reflective beam-steering array 140 are microelectromechanical systems (MEMS) mirrors. Operation of the MEMS mirror elements of first reflective beam-steering array 140 is described below in conjunction with FIG. 2. In other embodiments, first reflective beam-steering array 140 is a liquid crystal on silicon (LCOS) phased array.

Second reflective beam-steering array 150 includes a plurality of reflective beam-steering elements configured to direct incident wavelength components from first beam-steering array 140 to multiplexer 103. In the embodiment illustrated in FIG. 1, second reflective beam-steering array 150 is a rectangular array of reflective beam-steering elements. Each horizontal row of elements of second reflective beam-steering array 150 corresponds to one of output fibers OF1-OF16, and, similar to first beam-steering array 140, each vertical column of elements for second reflective beam-steering array 150 corresponds to one of the wavelength components λ1-λ4. Thus, in the embodiment illustrated in FIG. 1, second reflective beam-steering array 150 is configured as an array of four columns 171-174 and 16 rows of beam-steering elements. Each horizontal row of elements of second reflective beam-steering array 150 is positioned to receive individual wavelength components from individual reflective beam-steering elements in any row of first beam-steering array 140 and direct said wavelength components to multiplexer 103 and ultimately the corresponding output fiber. For example, the reflective beam-steering elements in first row 151 each receive one of four different wavelength components from first reflective beam-steering array 140 and individually direct the received wavelength components to multiplexer 103 and output fiber OF1. Similarly, the elements in second row 152 each receive wavelength components from first reflective beam-steering array 140 and direct said wavelength components to multiplexer 103 and output fiber OF2, the elements in third row 153 each receive wavelength components from first reflective beam-steering array 140 and direct the said wavelength components to multiplexer 103 and output fiber OF3, and so on. In some embodiments, the individual beam-steering elements of second reflective beam-steering array 150 are MEMS mirrors, whereas in other embodiments, second reflective beam-steering array 150 is a liquid crystal on silicon (LCOS) phased array.

Multiplexer 103 is a light-combining element that may be substantially similar to demultiplexer 102, except that multiplexer 103 is configured to spatially combine incident wavelength components into output light beams. In addition, multiplexer 103 is configured to direct the multiplexed output beams to output fibers OF1-OF16. For clarity of description, only output beams 181, 183, and 189 are illustrated in FIG. 1, but in practice each of output fibers OF1-OF16 may have an output beam directed thereto. Thus, wavelength components directed to multiplexer 103 from row 151 of second reflective beam-steering array 150 are combined by multiplexer 103 and directed to output fiber OF1, wavelength components directed to multiplexer 103 from row 152 are combined by multiplexer 103 and directed to output fiber OF2, and so on.

Coupling optics 121, 122 are each lenses or lens systems configured to shape and/or direct the wavelength components of each of input beams 111-118. Coupling optics 121, 122 may each include collimating and focusing optics and/or other suitable optical elements to ensure that wavelength components routed by first reflective beam-steering array 140 and second reflective beam-steering array 150 are collimated or focused as required. One of skill in the art, upon reading the disclosure herein, can readily devise a suitable configuration of coupling optics 121, 122. In some embodiments, one or more coupling optics are also disposed in the optical paths of wavelength components λ1-λ4 between first reflective beam-steering array 140 and second reflective beam-steering array 150, but are omitted in FIG. 1 for clarity.

Output collimators 104 include output ports that are optically coupled to output fibers OF1-OF16. Output collimators 104 are configured to direct outgoing light beams, i.e., output beams 181, 183, 189, et al., to output fibers OF1-OF16. Thus, output collimators 104 each focus a beam of collimated light into the end face of output fibers OF1-OF16. For optimal coupling of said output beams to output fibers OF1-OF16, output collimators 104 direct said output beams along substantially parallel optical paths to output fibers OF1-OF16.

In some embodiments, the individual beam-steering elements of first reflective beam-steering array 140 are MEMS mirrors, where typically one independently controlled MEMS mirror acts as an individual beam-steering element in first reflective beam-steering array 140. A separate one-dimensional array of MEMS mirrors may be used for each row of beam-steering elements of first reflective beam-steering array 140. Alternatively, a single two-dimensional MEMS mirror array may be used as first reflective beam-steering array 140, or two or more two-dimensional MEMS mirror arrays may be coupled together to form first reflective beam-steering array 140. In some embodiments, each reflective beam-steering element of first reflective beam-steering array 140 may be made up of multiple MEMS mirrors.

Figure 2:
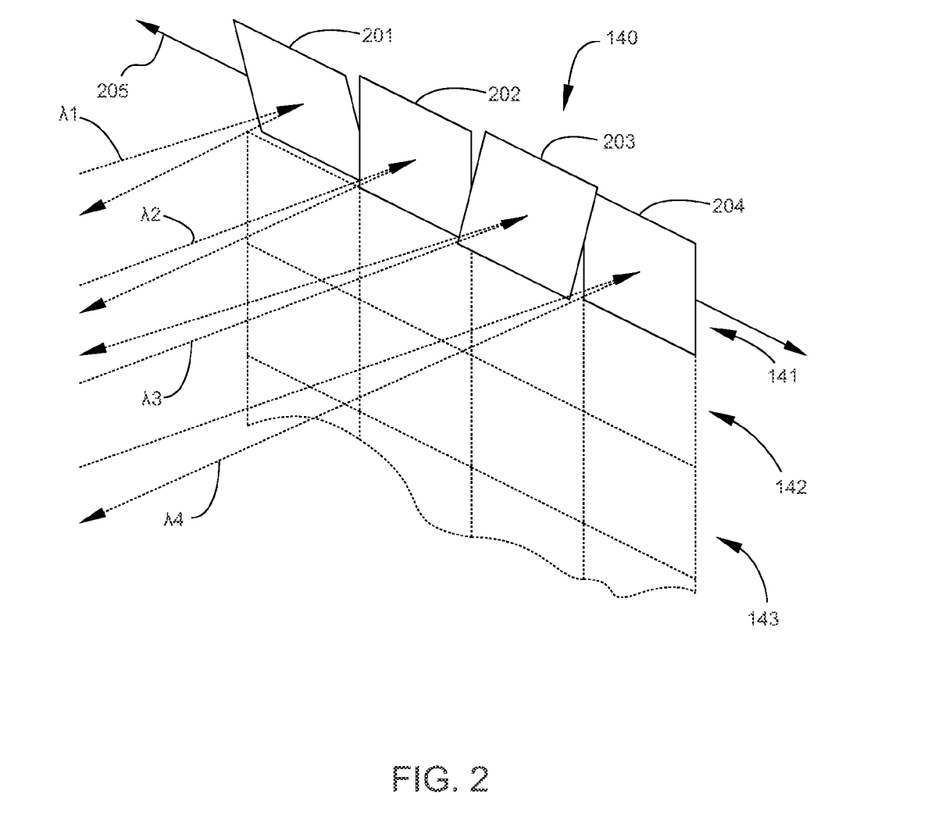
FIG. 2 schematically illustrates a partial perspective view of a configuration of a first reflective beam-steering array in which the individual beam-steering elements of the array are MEMS mirrors, according to an embodiment of the invention.

FIG. 2 schematically illustrates a partial perspective view of a configuration of first reflective beam-steering array 140 in which the individual beam-steering elements of the array are MEMS mirrors, according to an embodiment of the invention. For purposes of description, top row 141 of first reflective beam-steering array 140 is described in detail. As noted above, top row 141 may be a single one-dimensional array of four MEMS mirrors formed on a common substrate, or part of a two-dimensional array of MEMS mirrors formed on a common substrate. Top row 141 includes one reflective beam-steering element for each incident wavelength component λ1-λ4 that has been spatially separated from input beam 111. In a preferred embodiment, each reflective beam-steering element is a single MEMS mirror. Thus, a MEMS mirror 201 receives and directs wavelength component λ1, a MEMS mirror 202 receives and directs wavelength component λ2, a MEMS mirror 203 receives and directs wavelength component λ3, and a MEMS mirror 204 receives and directs wavelength component λ4.

In addition to making up a one-dimensional array of MEMS mirrors, MEMS mirrors 201-204 are "1-D" MEMS mirrors, i.e., MEMS mirrors that are rotatable about one axis of rotation and fixed with respect to the two other possible axes of rotation. Specifically, MEMS mirrors 201-204 are each configured to rotate about horizontal axis 205 to direct each of incident light beams, i.e., wavelength components λ1-λ4, along a desired optical path. Because MEMS mirrors 201-204 are constrained to only rotate about horizontal axis 205, first reflective beam-steering array 140 can be suitably aligned and positioned such that the rotation of MEMS mirrors 201-204 to different positions selectively directs wavelength components λ1-λ4, respectively, along any of a plurality of different optical paths to a specific reflective beam-steering element of second beam-steering array 150. Thus, rotation of MEMS mirror 201 to different positions about horizontal axis 205 directs wavelength component λ1 to any desired reflective optical element in column 171, rotation of MEMS mirror 202 to different positions directs wavelength component λ2 to any desired reflective optical element in column 172, rotation of MEMS mirror 203 to different positions directs wavelength component λ3 to any desired reflective optical element in column 173, and rotation of MEMS mirror 204 to different positions directs wavelength component λ4 to any desired reflective optical element in column 174.

The reflective beam-steering elements making up the remaining rows of first reflective beam-steering array 140, i.e., second row 142, third row 143, and so on, are configured to operate in the same way as first row 141. Therefore, any wavelength component from any of input beams 111-118 can be directed as desired by first beam-steering array 140 to any desired row of second beam-steering array 150. For example, as shown in FIG. 1, for input beam 111, wavelength component λ1 is directed by MEMS mirror 201 to the reflective beam-steering element disposed in row 151 and column 171 of second beam-steering array 150, wavelength component λ2 is directed by MEMS mirror 202 to the reflective beam-steering element disposed in row 153 and column 172, wavelength component λ3 is directed by MEMS mirror 203 to the reflective beam-steering element disposed in row 151 and column 173, and wavelength component λ4 is directed by MEMS mirror 204 to the reflective beam-steering element disposed in row 159 and column 174. Because each of MEMS mirrors 201-204 are independently controllable, the optical paths illustrated in FIG. 1 for wavelength components λ1-λ4 can be reconfigured at will.

In some embodiments, first reflective beam-steering array 140 and/or second reflective beam-steering array 150 may be a liquid-crystal on silicon (LCOS) phased array. As is well-known in the art, an LCOS phased array can aim incident laser beams by controlling the phase of light waves reflecting from a two-dimensional surface by means of adjustable surface elements disposed on the surface, where pixels of the LCOS phased array act as the adjustable surface elements. Thus, the wavelength component steering scheme described above for MEMS mirrors 201-204 in FIG. 2 can also be implemented using LCOS phased array panels. The desired steering is performed without the need for moving parts by introducing a suitable phase delay with each LCOS pixel relative to the other pixels. High-resolution LCOS panels, such as panels having 1920×1028 pixels, have adequate resolution to perform phased-array steering of 96 or more wavelength components, and can therefore readily be configured for use as first reflective beam-steering array 140 and/or second reflective beam-steering array 150 in WSS 100. In embodiments in which an even larger number of components is contained in each of input beams 111-118, two or more LCOS panels may be coupled to form a single higher-resolution phased array.

Referring back to FIG. 1, in operation, WSS 100 receives input beams 111-118 from input fibers IF1-IF8 and switches wavelength components λ1-λ4 of each input beam to a desired output fiber. Because first reflective beam-steering array 140 and second reflective beam-steering array 150 are each made up of independently controllable and rotatable reflective beam-steering elements, WSS 100 has full M×N wavelength-selective switching capability, i.e., any wavelength component for any of input beams 111-118 can be directed as desired to any of output fibers OF1-OF16. Thus, for input beam 111, wavelength components λ1-λ4 can each be directed to any of output fibers OF1-OF16 in any combination desired. In the example embodiment illustrated in FIG. 1, wavelength components λ1 and λ3 for input beam 121 are both directed to row 151 and, hence, output fiber OF1. Although not shown, a wavelength component λ2 and/or a wavelength component λ4, each from any of input fibers 112-118, can also be directed to row 151 and optically coupled to output fiber OF1. Similarly, wavelength component λ2 from input beam 111 is directed to row 153 of second reflective beam-steering array 150, and is therefore optically coupled to output fiber OF3. If desired, wavelength component λ2 may be combined with wavelength components λ1, λ3, and/or λ4 (not shown) of input beams 112-118. Lastly, wavelength component λ4 from input beam 111 is direct to output fiber OF16 via row 159 of second reflective beam-steering array 150, and can be combined with any of wavelength components λ1, λ2, and/or λ3 (not shown) of input beams 112-118. One example thereof is illustrated in FIG. 1, in which wavelength component λ1 of input beam 118 is also directed to row 159 and is combined with wavelength component λ4 of input beam 111.

In some embodiments, an M×N WSS may include an attenuation function, so that wavelength components contained in output beams coupled to output fibers OF1-OF16 have substantially the same optical output level. The attenuation function can be implemented in a number of different ways. One embodiment is to slightly offset the beam steering angles of the reflective beam-steering elements in first reflective beam-steering array 140 and/or second reflective beam-steering array 150 from an optimal beam-steering angle to cause some additional attenuation along the optical path of a particular wavelength component. When the beam-steering angle of the reflective beam-steering is offset from the optimal beam-steering angle, a portion of the wavelength component being directed will not be incident on the desired output fiber and the optical energy of the wavelength component is reduced accordingly. However, such an approach can require very accurate beam steering angle control. In another embodiment, an attenuation scheme may include an array of beam-polarization rotating liquid-crystal (LC) elements combined with polarization filtering optics, so that wavelength components of each of input beams 111-118 may each be attenuated as desired. In such a scheme, WSS 100 further includes a polarization walk-off array 191 disposed proximate array of input collimators 101, a polarization combining array 192 disposed proximate array of output collimators 104, and an array of polarization rotation LCs 193 (shown in FIG. 4), which are disposed proximate first reflective beam-steering array 140. The LC elements in the array of polarization rotation LCs 193 apply a controllable amount of polarization rotation to each wavelength component. An exemplary element of polarization walk-off array 191 and an exemplary element of polarization combining array 192 are described below in conjunction with FIG. 3, and array of polarization rotation LCs 193 is described below in conjunction with FIG. 4.

LC-based polarization rotation devices are known in the art for attenuating light beams, such as one or more of the wavelength components in input beams 111-118. One issue with using such devices for attenuation is related to the polarization state of an input light beam. Because LC-based polarization rotation devices rely on rotating the polarization state of linearly polarized input light to perform attenuation or switching functions, the input light beam must have a single known polarization state for such a device to vary the attenuation of the light beam as desired. However, optical signals transmitted over optical fibers are usually randomly polarized, i.e., the optical signals are a random superposition of s- and p-components. An approach known in the art for addressing this issue involves performing a polarization "walk-off" with a birefringent optical element to spatially divide a light beam into two parallel light beams having the same polarization state, so that an LC-based polarization rotation device can subsequently apply a controllable amount of polarization rotation to each beam. The polarization rotation applied to the two parallel beams translates into the desired amount of signal attenuation when the two parallel light beams are recombined at the polarization combining array 192.

Figure 3:
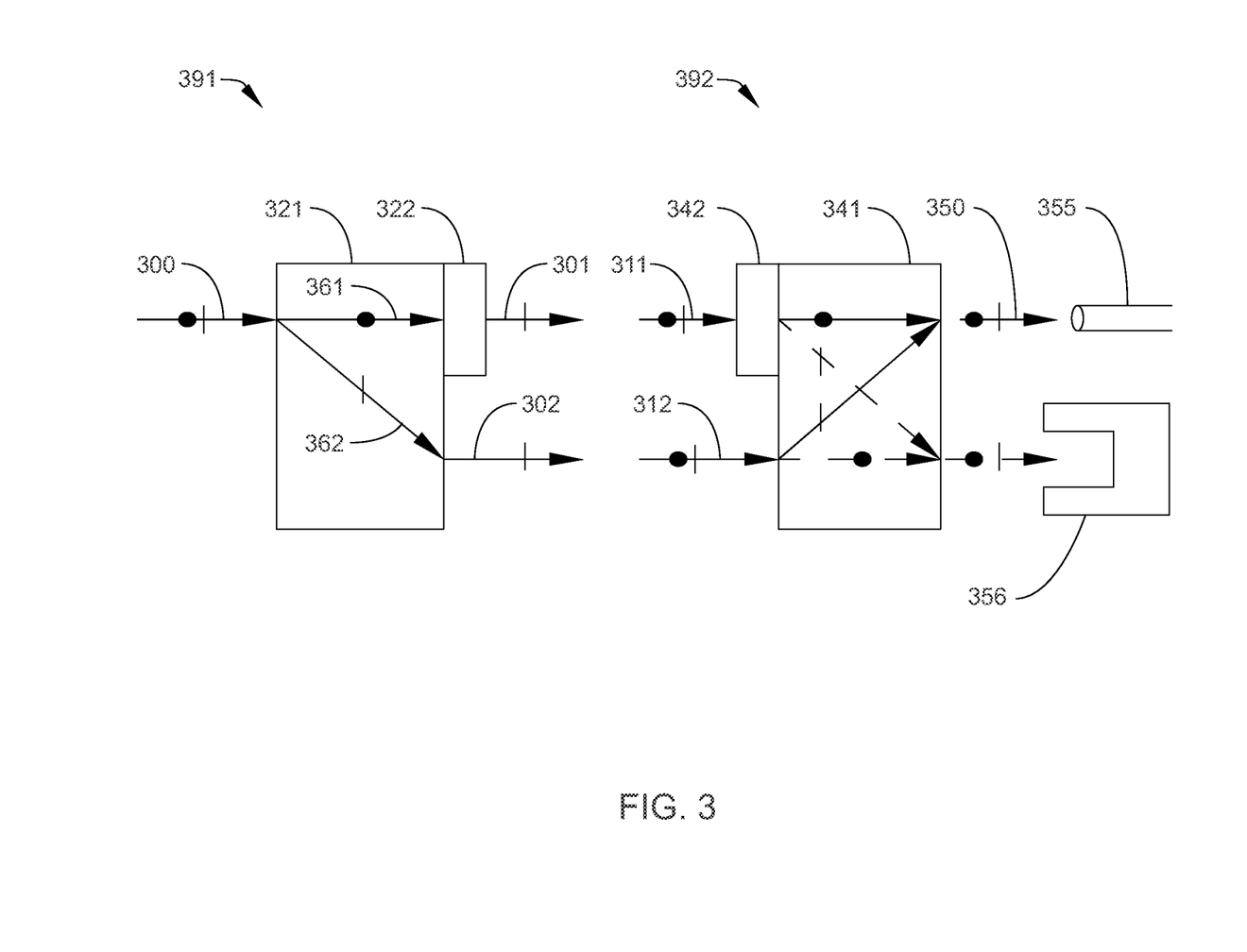
FIG. 3 schematically illustrates one polarization walk-off assembly, which makes up one element of a polarization walk-off array, and one polarization combining assembly, which makes up one element of a polarization combining array, according to an embodiment of the invention.

FIG. 3 schematically illustrates one polarization walk-off assembly 391, which makes up one element of polarization walk-off array 191, and one polarization combining assembly 392, which makes up one element of polarization combining array 192, according to an embodiment of the invention. Polarization walk-off array 191 includes one polarization walk-off assembly 391 for each of input fibers IF1-IF8, and polarization combining array 192 includes one polarization combining assembly 392 for each of output fibers OF1-OF16.

Polarization walk-off assembly 391 includes a birefringent walk-off plate 321 and a reciprocal optical rotator 322, and converts an input beam 300 having arbitrary polarization to parallel light beams 301, 302 having only a single linear polarization orientation. Thus, input beam 300 includes an arbitrary combination of mutually orthogonal linearly polarized components, i.e., an s-polarized component (denoted by a circle) and a p-polarized component (denoted by a line), and parallel light beams 301, 302 include essentially only one linear polarization, i.e., p-polarization. For purposes of description, polarization walk-off assembly 191 is depicted converting input beam 300 into two parallel p-polarized light beams, but configurations of polarization walk-off assembly 391 that covert an input beam into two parallel s-polarized light beams also fall within the scope of the invention.

Birefringent walk-off plate 321 is optically coupled to a collimator in array of input collimators 101 and receives input beam 300. Birefringent walk-off plate 321 is a birefringent material oriented to physically separate input beam 300 into a deflected light beam 362 and an un-deflected light beam 361. Deflected light beam 362 includes the p-polarized component of input beam 300 and un-deflected light beam 361 includes the s-polarized component of input beam 300. Reciprocal optical rotator 322 is comprised of a half-wave plate that rotates the polarization of incident linearly polarized light 90°, so that the polarization of un-deflected light beam 361 is changed from s-polarized to p-polarized light, and parallel light beams 301, 302 have the same polarization. Parallel light beams 301, 302 can then be conditioned by an LC-based polarization rotation element disposed in array of polarization rotation LCs 193 as part of an attenuation scheme described below.

Polarization combining assembly 392 is configured to combine two parallel light beams into a single output beam. Polarization combining assembly 392 includes a birefringent walk-off plate 341 and a reciprocal optical rotator 342, and has a reciprocal configuration to polarization walk-off assembly 391 in order to physically combine parallel light beams 311, 312 into a single output beam 350. Single output beam 350 can then be directed to an output fiber 355. Polarization combining assembly 392 is further configured to direct unwanted optical energy from parallel light beams 311, 312 to a light dump 356 in order to attenuate the optical signal directed to output fiber 355. Parallel light beams 311, 312 correspond to parallel light beams 301, 302 after being conditioned by an LC element in array of polarization rotation LCs 193, and therefore each include s- and p-polarized components if attenuation of input beam 300 is desired. As shown, the s-polarized components of parallel light beams 311, 312, which correspond to the optical energy to be removed as part of the attenuation process and are denoted as dashed lines, are directed to light dump 356 by polarization combining assembly 392. Thus, input light beam 300 is attenuated by converting a desired portion of the optical energy in parallel light beams 301, 302 to s-polarized light, which is the function of LC elements in array of polarization rotation LCs 193.

Figure 4:
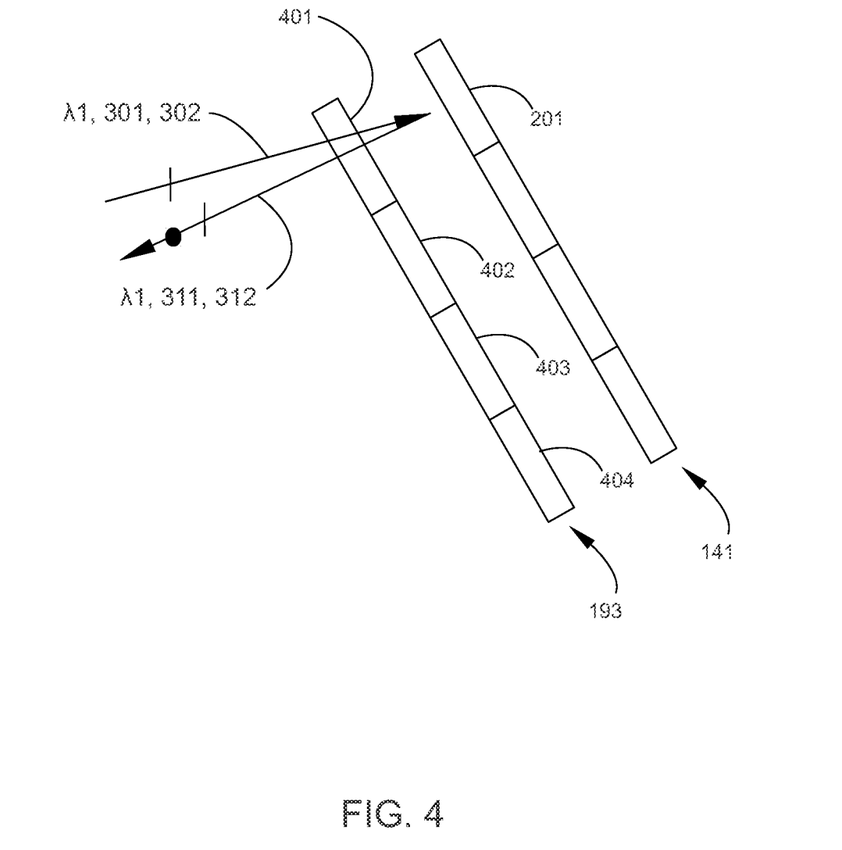
FIG. 4 schematically illustrates a plan view of an array of beam-polarization rotating LCs and a first reflective beam-steering array, according to an embodiment of the invention.

FIG. 4 schematically illustrates a plan view of array of polarization rotation LCs 193 and first reflective beam-steering array 140, according to an embodiment of the invention. Alternatively, the polarization rotation LCs could be combined with the second reflective beam-steering array 150. For clarity, only a single row of LC elements 401-404 in array of polarization rotation LCs 193 and row 141 of first reflective beam-steering array 140 are shown. LC elements 401-404 contain polarization-rotating LC material having a molecular orientation that rotates the polarization state of wavelength component λ1. As shown, wavelength component λ1 passes through LC element 401, is reflected from MEMS mirror 201, and then passes through LC element 401 a second time. When attenuation of wavelength component λ1 is desired, LC element 401 conditions the polarization state of wavelength component λ1 accordingly. For example, if 10% attenuation of wavelength component λ1 is desired, LC element 401 converts 10% of the optical energy of wavelength component λ1 to s-polarized light, which will ultimately be directed to light dump 356 in FIG. 3. Thus, wavelength component λ1 in FIG. 4 includes parallel light beams 301, 302 before passing through LC element 401, and includes parallel light beams 311, 312 after passing through LC element 401.

One of skill in the art will appreciate that the LC-based attenuation scheme described herein allows "hitless" switching of wavelength components between different output fibers OF1-OF16. Specifically, because essentially all of the optical energy of a wavelength component can be converted to s-polarized light prior to switching the wavelength component, and because the light dumps for WSS 100 can be disposed in a column adjacent to the column formed by output fibers OF1-OF16, the wavelength component being switched from a first output fiber to a second output fiber does not have to pass over intervening output fibers when switching the wavelength component from the first output fiber to the second output fiber. Instead, the wavelength component can be directed over the light dumps corresponding to the intervening output fibers when switching the wavelength component from the first output fiber to the second output fiber. Once the switching operation is completed, the polarization of the wavelength component can be returned to the desired value and some or all of the optical energy from the wavelength component will be directed to the desired output port.

In embodiments in which first reflective beam-steering array 140 and/or second reflective beam-steering array 150 is an LCOS phased array, attenuation can be performed without a separate attenuation device such as array of polarization rotation LCs 193. Instead, the LCOS phased array can perform steering and attenuation simultaneously, since the LCOS phase map can be selected to direct an unwanted portion of optical energy to a light dump positioned proximate output fibers OF1-OF16. In such embodiments, polarization walk-off array 191 and polarization combining array 192 are generally still required since LCOS panels are usually polarization sensitive.

Figure 5:
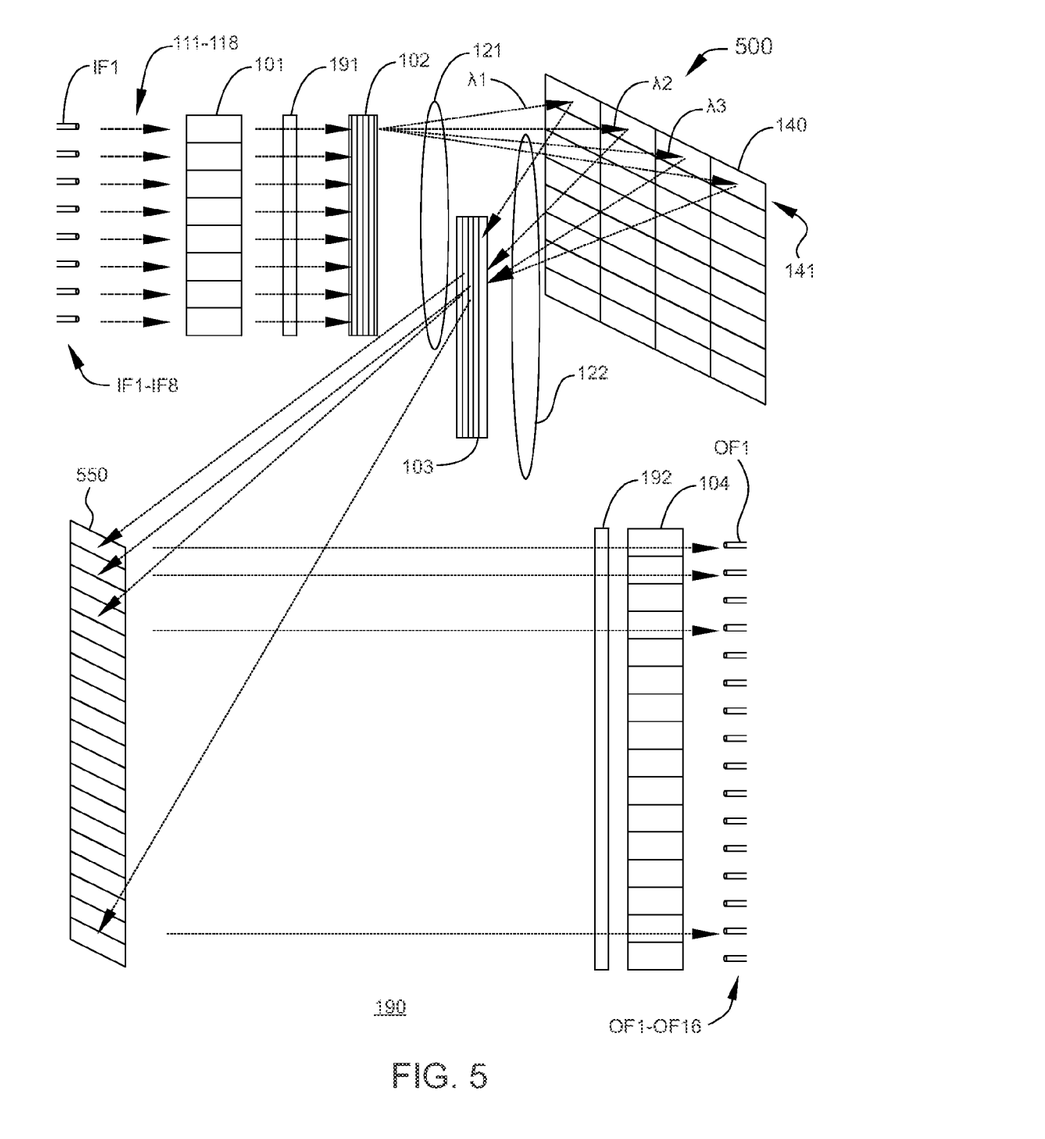
FIG. 5 schematically illustrates a WSS having wavelength selective M×N switching with blocking, according to embodiments of the invention.

WSS 100 illustrates an embodiment of the invention which has full wavelength selective M×N non-blocking capability, i.e., any wavelength component of all input fibers can be directed to any output fiber as desired. In some applications, such switching flexibility is not required. FIG. 5 schematically illustrates a WSS 500 having wavelength selective M×N switching with blocking, according to embodiments of the invention. WSS 500 is capable of switching any wavelength components from any single input fiber to any desired output fiber, but cannot switch wavelength components from two different input fibers to the same output fiber. This is because only a single two-dimensional reflective beam-steering array is used, i.e., reflective beam-steering array 140. Thus, certain combinations of wavelength switching are "blocked." However, the configuration of WSS 500 greatly simplifies the cost and complexity of WSS 500 with respect to WSS 100.

WSS 500 is substantially similar in organization and operation to WSS 100 in FIG. 1, except that WSS 500 does not include a second two-dimensional reflective beam-steering array, such as second reflective beam-steering array 150. Instead, WSS 500 includes a one-dimensional reflective beam-steering array 550 as shown, which is adapted to direct multiplexed light beams to output fibers OF1-OF16 instead of directing individual wavelength components. In addition, multiplexer 103 and coupling optics 122 are repositioned accordingly. One-dimensional reflective beam-steering array 550 may be a one-dimensional array of MEMS mirrors or an LCOS phased array panel. One of skill in the art will appreciate that various attenuation schemes may be implemented in WSS 500 in the same fashion as described above for WSS 100. For example, slightly offsetting or misaligning the beam steering elements will introduce a controlled amount of loss. Alternatively, introducing an LC-based polarization rotation array proximate to the beam steering arrays also enables attenuation control.

WSS 100 illustrates an M×N WSS that is based on a "transmissive" model, in which light beams enter the WSS at one point, pass through or otherwise interact with each element of the WSS once, and exit the WSS at a second point. Because optical elements can typically be used bi-directionally, and because the reduced overall size of a WSS is advantageous, embodiments of the invention contemplate a WSS that is based on a "reflective" model. In a reflective model, output fibers and input fibers are positioned proximate each other and pointing in the same direction, and a reflective element is employed so that some or all of the optical components in the WSS are used bi-directionally.

Figure 6:
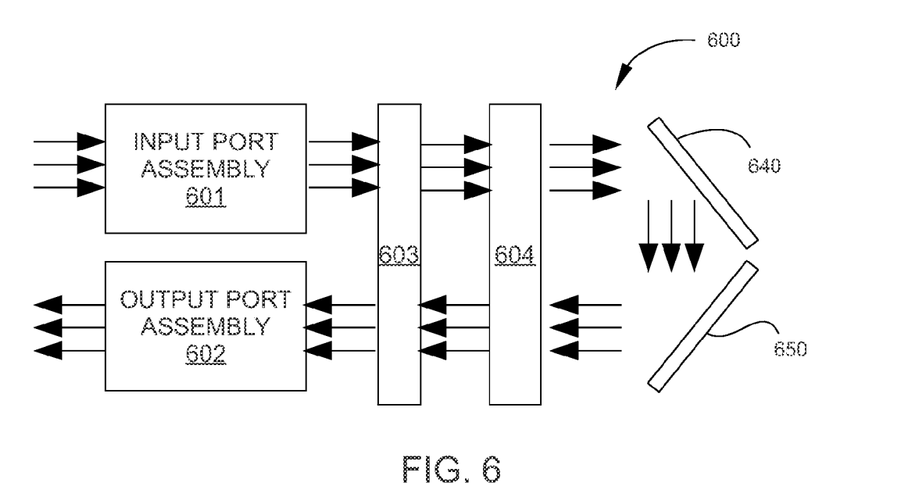
FIG. 6 is a schematic block diagram of a WSS that uses reflective beam-steering arrays to direct light beams through bidirectional optical components, according to an embodiment of the invention.

FIG. 6 is a schematic block diagram of a WSS 600 that uses reflective beam-steering arrays to direct light beams through bidirectional optical components, according to an embodiment of the invention. WSS 600 includes an input port assembly 601, an output port assembly 602, a polarization management assembly 603, a diffraction grating 604 and first and second reflective beam-steering arrays 640, 650. Input port assembly 601 houses a plurality of input fibers substantially similar to input fibers IF1-IF8 and collimators substantially similar to input collimators 101 in FIG. 1. Output port assembly 602 houses a plurality of output fibers substantially similar to output fibers OF1-OF16 and collimators substantially similar to output collimators 104 in FIG. 1. Polarization management assembly 603 includes a polarization walk-off array substantially similar to polarization walk-off array 191 and a polarization combining array substantially similar to a polarization combining array 192. Diffraction grating 604 is substantially similar in operation to demultiplexer 102 and multiplexer 103. First and second reflective beam-steering arrays 640, 650 are substantially similar in organization and operation to first and second reflective beam-steering arrays 140, 150, but are oriented as shown to facilitate bidirectional use of polarization management assembly 603 and diffraction grating 604. One of skill in the art will appreciate that appropriate coupling optics are required to ensure efficient couple of light from one section to the next in WSS 600.

Figure 7:
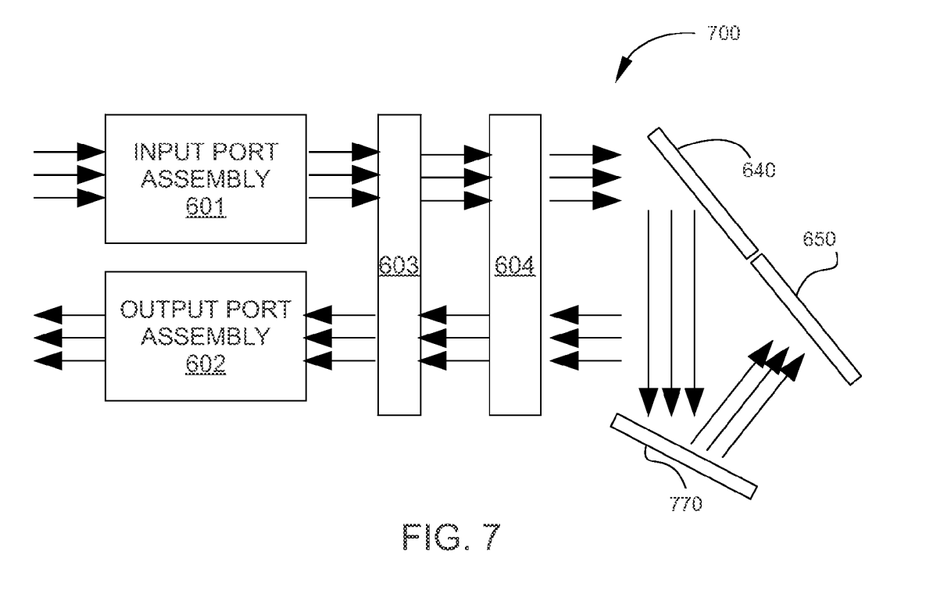
FIG. 7 is a schematic block diagram of a WSS that uses reflective beam-steering arrays to direct light beams through bidirectional components, according to a different embodiment of the invention.

FIG. 7 is a schematic block diagram of a WSS 700 that uses reflective beam-steering arrays to direct light beams through bidirectional components, according to a different embodiment of the invention. WSS 700 is substantially similar in organization and operation to WSS 600, except that WSS 700 further includes a reflector 770 and first and second reflective beam-steering arrays 640, 650 are positioned as shown.

Embodiments of the invention disclosed herein are described in terms of reflective beam-steering arrays to direct and attenuate wavelength components of multiple WDM signals. Alternatively, other beam-steering technologies may be used to direct and attenuate wavelength components in an M×N WSS, without departing from the scope of the invention. For example, polarization rotating LC arrays may be used not only for attenuation, as described above in conjunction with FIG. 4, but as part of a beam-steering and switching scheme. In such an embodiment, wavelength components pass through a two-dimensional array of LC elements and are subsequently steered along a desired optical path based on the polarization rotation introduced by the LC element. In other embodiments, wavelength components may be steered and/or attenuated using DLP® (digital light processing) technology, which is based on a particular type of MEMS mirror.

According to some embodiments of the invention, a WSS with per wavelength component, M×N switching capability includes a reflective dispersive device, rather than a transmissive dispersion device, as shown in FIGS. 1, 5, 6, and 7. The reflective dispersive device demultiplexes the M input optical signals into wavelength components and multiplexes combinations of incident wavelength components into the N output optical signals. Because the dispersion device in such embodiments operates in reflective mode, the M input ports and the N output ports can be positioned as adjacent stacks, thereby enabling a smaller configuration for an M×N WSS. Furthermore, in some such embodiments, only a single reflective beam-steering array may be required to perform wavelength component, M×N switching.

Figure 8:
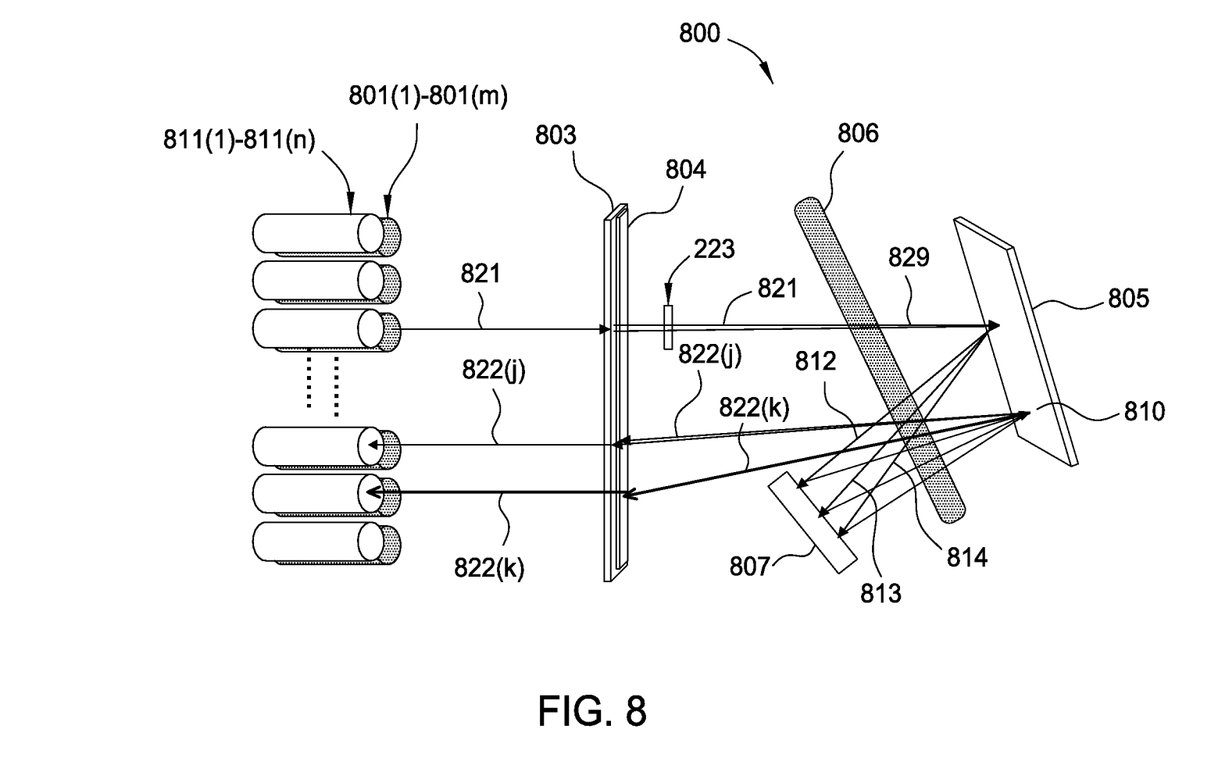
FIG. 8 shows a schematic view of one embodiment of a multi-pole wavelength selective optical router.

FIG. 8 shows a schematic view of one embodiment of a multi-pole wavelength selective optical router 800. Multi-pole wavelength selective optical router 800 can simultaneously route individual signal channels originating from multiple multi-wavelength input optical signals to a multiple multi-wavelength output optical signals. The exemplary embodiment shown in FIG. 8 includes a stack of M input ports 801(1)-801(m) and a stack of N output ports 811(1)-811(n). In this example, each of input ports 801(1)-801(m) is a fiber interface that converts an input signal received on a fiber to a free-space beam within the router. Input beam 821 is one such free-space beam. Likewise, each of output ports 811(1)-811(n) is a fiber interface that converts a free-space output beam within the router (output beam 822(j) or 822(k), for example), to an output signal to be transmitted on an output fiber. Hereinafter, the terms "input beam" and "output beam" may be synonymously replaced for "input signal" and "output signal," respectively.

Multi-pole wavelength selective optical router 800 receives multiple input optical signals, each at a respective input port 801(1)-801(m). For ease of discussion, only one input signal 821 is shown in FIG. 8. Each input signal comprises a plurality of wavelength components. The principles embodied in the example shown in FIG. 8 using a single input beam 821 is merely illustrative and is equally applicable to any other input signal arriving simultaneously at any other input port. The illustrative example is by no means to be construed as limiting to only one input signal 821.

For ease of discussion, the following convention is adopted in describing the invention: a light path such as input beam 821 originating at an input port and traversing left to right within the router will be referred as a forward path, whereas a light path directed towards an output port within the router, such as output beams 822(j) or 822(k), will be referred as a return path. The designations of 'forward' and 'return' paths are only exemplary and are not to be construed as restrictive. Other conventions for designating forward and return paths may be adopted without deviating from the basic principles of the current invention.

A polarization selection device 803, with a part of one surface covered with a half wave plate 804, generates a pair of parallel and closely-spaced beams (collectively shown as input beam 829 in FIG. 8) from each input beam traversing in the forward path. The polarization state of input beam 821 is adjusted to a predetermined polarization state (denoted with a vertical line 823), such that each pair of beams (represented by input beam 829) traverses the router in a single known polarization state irrespective of the initial polarization state of the originating input beam 821. In some embodiments, polarization selection device 803 is substantially similar in organization and operation to polarization walk-off assembly 391 and polarization combining assembly 392.

By applying a single, known polarization state, the plurality of input signals can be laterally displaced and separated using any methods well-known in the art, such as with an anamorphic lens, a birefringent wedge, etc. Furthermore, applying a single, known polarization state to input beam 821 allows controlled attenuation of input beam 829 at the output ports, by applying a predetermined polarization rotation, as described above for polarization rotation LCs 193.

Input beam 821, with the single, known polarization state, is incident on a dispersive device 805. In this example, dispersive device 805 is shown to be operative in a reflection mode and may comprise a reflection grating or any other reflective dispersive device known in the art. Dispersive device 805 separates input beams 821 into different wavelength components, referred to herein as signal channels 812, 813, and 814. Each of signal channels 812, 813, and 814 is imaged using a focusing element 806, comprising one or more focusing optics, onto a beam steering module 807. Beam steering module 807 may be substantially similar in organization and operation to first reflective beam-steering array 140, illustrated in FIG. 1. Focusing element 806 may be arranged in a plane which is different from the plane that includes input beam 829 and dispersive device 805 (i.e., the dispersion plane), such that dispersive device 805 images signal channels 812, 813, and 814 on a different plane, preferably a plane perpendicular to the plane including input beam 829 and dispersive device 805.

Beam steering module 807 deflects each of signal channels 812-814 impinging thereupon to a desired output port. Therefore selection of output ports 811(1)-811(n) within a stack is determined by the amount of deflection applied to each signal channel 812-814. However, to select an output port at a same vertical level in an adjacent stack may require additional polarization switching devices as has been disclosed in the co-pending PCT application No. PCT/IL2010/000479 which is herein being incorporated by reference, in its entirety. Each signal channel 812-814 deflected from beam steering module 807 passes through focusing element 806 and is focused back onto dispersive device 805, each at a different spot (for example, spot 810), depending on which of output ports 811(1)-811(n) is selected for the respective signal channel 812-814.

The deflected signal channels to each destined output ports pass through polarization selection device 803, which is disposed in the return path and functions as a polarization conversion device to combine signal channels 812-814 having the known, single polarization state into one or more output beams for an output port selected from output ports 811(1)-811(n). Signal channels 812-814 arriving at any output port with polarization state rotated by a predetermined amount from the single known polarization state are attenuated in proportion to the amount of polarization rotation applied to each signal channel 812-814 after being deflected in the respective beam steering device 207. In some embodiments, such polarization rotation is accomplished using an array of polarization rotation LCs similar to array of polarization rotation LCs 193 shown in FIG. 4. These polarization rotation LCs may be disposed proximate beam steering module 807 and in the optical path of signal channels 812-814.

In the exemplary configuration shown in FIG. 8, a single dispersive device is shown to serve all the input beams. Alternatively, more than one dispersive device may be used to serve the plurality of input beams. In FIG. 8, all the output signal channels are shown to be originating from the same input beam. In practice, it need not be so. Signal channels originating from different input beams may be directed to the same output and may be combined into an output beam with the exception of two signal channels having the same wavelength. The dispersive device in the return path multiplexes all the signal channels destined for one or more output ports, into corresponding output beams, such as 822(j) and 822(k).

Figure 9:
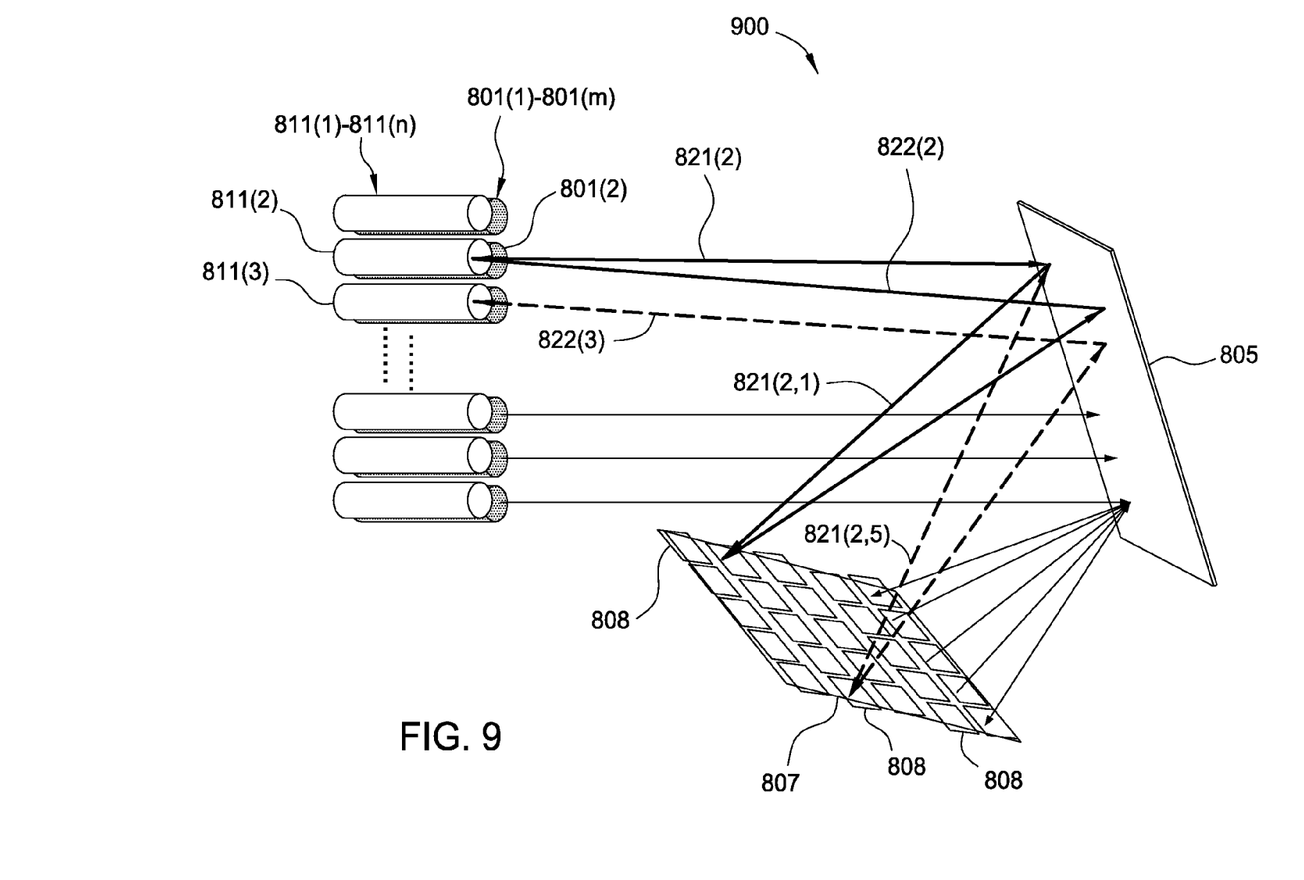
FIG. 9 shows a schematic representation of one embodiment of a beam steering module showing a two-dimensional array of beam steering devices arranged in one-dimensional arrays.

FIG. 9 shows a schematic representation 900 of one embodiment of beam steering module 807 showing a two-dimensional array of beam steering devices arranged in one-dimensional arrays. For clarity, polarization selection device 803 and focusing element 806 are not shown in this illustration. As shown, an input beam 821(2) originating at one input port 801(2) is incident upon dispersive device 805, and is dispersed into input signal channels 821(2,1) and 821(2,5). Each of these signal channels is then incident on beam steering module 807, which includes one-dimensional arrays of beam steering devices 808 and corresponding one-dimensional arrays of polarization control devices (not shown for clarity).

Each signal channel incident on beam steering module 807 is steered by one of beam steering devices 808. The specific beam steering device 808 depends on the originating input beam of the specific signal channel and the wavelength of the wavelength channel. The steered signal channels are each directed to a selected output port by the appropriate beam steering device 808 of beam steering module 807. In the example illustrated in FIG. 9, input beam 821(2) is separated into input signal channels 821(2,1) (solid line) and 821(2,5) (dotted line). Input signal channel 821(2,1) is steered to an output port 811(2) as output signal channel 822(2), and input signal channel 821(2,5) is steered to an output port 811(3) as output signal channel 822(3).

In the exemplary arrangement of the multi-pole router shown in FIGS. 8 and 9, the basic operation of multi-pole wavelength selective router 800 is described where only one polarization selection device 803 and one dispersive device 805 are shared by all input beams. It is noted that a plurality of polarization selection/conversion devices may be stacked vertically to perform the desired operation on a respective input beam, or a group of input beams. Other arrangements of polarization selection/conversion operation also fall within the scope of the invention.

Figure 10:
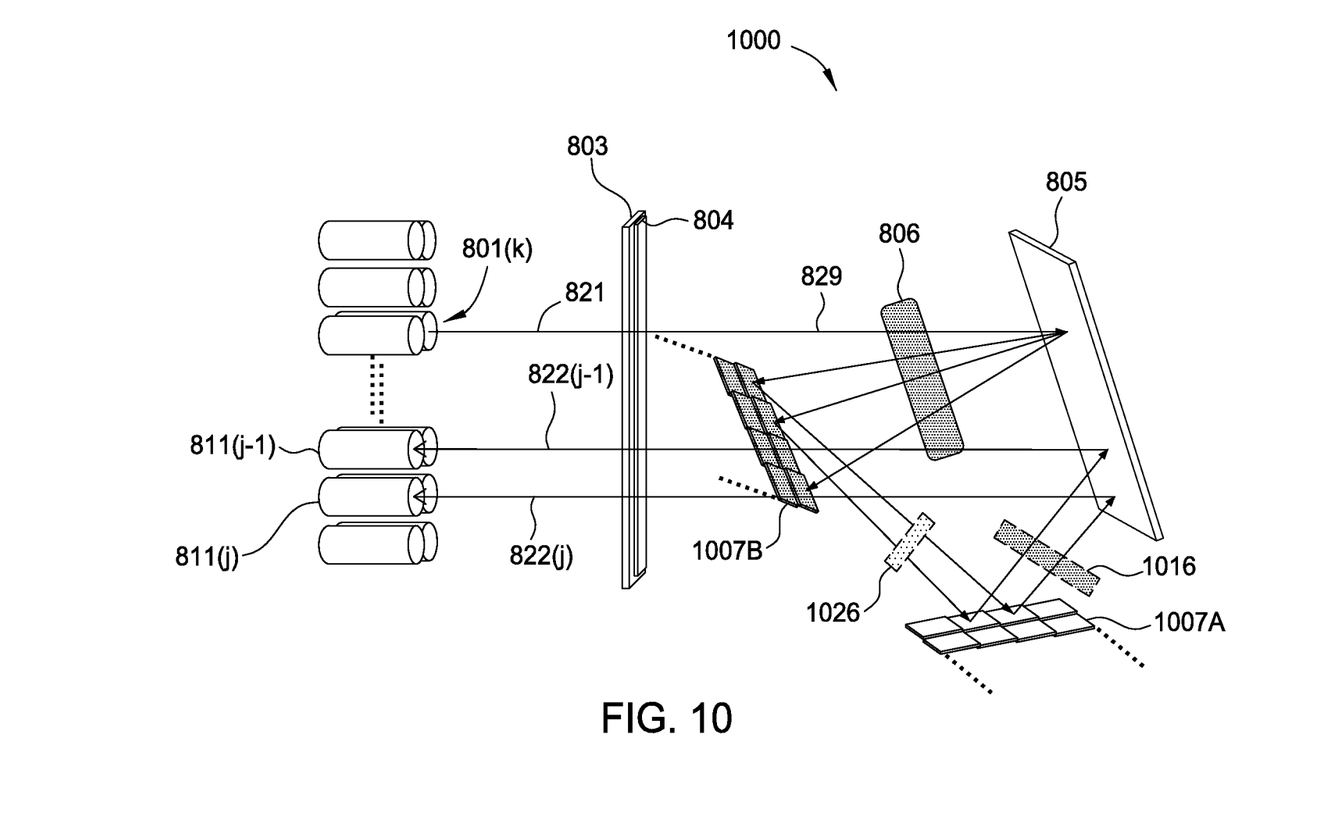
FIG. 10 shows a schematic view of an alternative embodiment of a multi-pole wavelength selective router, where beam steering operation is performed in two steps to achieve desired angular deflection accurately.

The router configuration shown in FIGS. 8 and 9 requires that beam steering device 807 covers a wide angular range of deflection to cover the entire stack (in the vertical direction) of output ports. Often, cost-effective single-axis rotation beam steering devices, such as single axis rotation MEMS devices, are not available with a wide angular range and desired accuracy. FIG. 10 shows a schematic view of an alternative embodiment of a multi-pole wavelength selective router 1000, where beam steering operation is performed in two steps to achieve desired angular deflection accurately. In such embodiments, beam steering devices having limited angular range may be used. Additional advantages of this configuration include steering operation in multiple planes that uses a smaller physical space.

Multi-pole wavelength selective router 1000 shown in FIG. 10 is similar to multi-pole wavelength selective optical router 800 shown in FIG. 8, including multiple input and output ports, arranged in two adjacent stacks. The input signal 821 is interfaced using an input port 801(k) and traverses polarization selection device 803 and half-wave plate 804 for setting a polarization state of the input beam pair (collectively represented as 829). Input beam 829 is separated into its wavelength components (also referred to as signal channels) by dispersive device 805 and focusing element 806 images different signal channels onto respective pixels of a first beam steering module 1007A.

Individual signal channels are imaged onto a respective pixel of a second beam steering module 1007B after deflection from first beam steering module 1007A for additional deflection. After second deflection, the signal channels are imaged by additional focusing devices 1016 and 1026 onto the dispersive device 605, each at a different spot based on the total deflection applied by beam steering modules 1007A and 1007B. All the signal channels designated to reach a particular output port of output ports 811(1)-811(N) are multiplexed into an output signal to reach the desired output port via polarization selection device 803 and half-wave plate 804. For example, output signal 822(j) is directed to output port 811(j) and output signal 822(j-1) is directed to output port 811(j-1).

The beam steering modules 1007A and 1007B may be similar to beam steering module 807, and may be constructed using a MEMS array and a LC array for attenuation, as described above. In this configuration, one of beam steering modules 1007A and 1007B may not include an LC array, since the required polarization rotation may be provided by one LC array. While the configuration of multi-pole wavelength selective router 1000 shown in FIG. 10 does require two one-dimensional beam steering modules, it can still be cost-effective, since the cost of two one-dimensional MEMS arrays including micro-mirrors with a single axis of rotation is generally less than the cost of implementing a more complex control system for a two-dimensional beam steering array associated with two-dimensional MEMS arrays.

While only one dispersive device 805 is shown in FIG. 10, in some embodiments, a second dispersive device may be used in the return path of multi-pole wavelength selective router 1000. An arrangement using a second dispersive device allows alternative arrangements of output ports that may be beneficial in utilizing the physical space within the router more efficiently. For example, output ports 811(1)-811(n) may be located in a different plane, in a two dimensional array, etc. These and many other options may be apparent to those skilled in the art in constructing a device within the framework of the current invention.

In sum, embodiments of the invention provide a WSS with M×N switching capability in a single device. Through the use of one or two two-dimensional reflective beam-steering arrays and an LC array, a compact and scalable M×N switching device with hitless switching and per-wavelength component attenuation is realized.

While the foregoing is directed to embodiments of the present invention, other and further embodiments of the invention may be devised without departing from the basic scope thereof, and the scope thereof is determined by the claims that follow.

We claim:

1. An optical device having multiple input and output ports, comprising:
a light diffracting element positioned in an optical path of optical signals comprising a first optical signal transmitted through a first input port and a second optical signal transmitted through a second input port, the light diffracting element separating the optical signals into wavelength components; and
first and second arrays of independently controlled reflective beam steering elements, each beam steering element of the first array being independently controlled to direct one of the wavelength components to a selected one of the beam steering elements of the second array, each beam steering element of the second array being independently controlled to direct the wavelength component incident thereon to a selected one of the output ports, a wavelength component of the first optical signal and a wavelength component of the second optical signal are combinable to produce an output optical signal at a selected one of the output ports,
wherein at least one of the beam steering elements in at least one of the first and second arrays being configured to attenuate at least one wavelength component by directing the at least one wavelength component with a beam-steering angle that is offset from an optimal beam-steering angle.

2. The optical device of claim 1, further comprising: a light combining element positioned between the second array of independently controlled beam steering elements and the output ports to combine the wavelength components directed by the beam steering elements of the second array to produce a plurality of output optical signals, each of which is transmitted through one of the output ports.

3. The optical device of claim 1, wherein the wavelength components of one of the optical signals transmitted through the input ports include a first wavelength component and a second wavelength component, and the first wavelength component and the second wavelength component are transmitted through different output ports.

4. The optical device of claim 1, wherein the beam steering elements comprise microelectromechanical systems (MEMS) mirrors.

5. The optical device of claim 4, wherein the MEMS mirrors are formed on a common substrate.

6. The optical device of claim 1, wherein the beam steering elements comprise a liquid-crystal on silicon (LCOS) phased array.

7. The optical device of claim 1, further comprising an array of liquid-crystal based polarization rotation elements disposed in an optical path of wavelength components directed by beam steering elements of the first or second arrays and configured to condition polarization of the wavelength components.

8. The optical device of claim 1, further comprising at least one light dump disposed adjacent to the output ports.

9. The optical device of claim 1, wherein wavelength components are directed with "hitless" operation.

10. An optical device having multiple input and output ports, comprising:
- a light diffracting element positioned in an optical path of optical signals comprising a first optical signal transmitted through a first input port and a second optical signal transmitted through a second input port, the light diffracting element separating the optical signals into wavelength components;
- a polarization walk-off array positioned in the optical path of the wavelength components, the polarization walk-off array converting the optical signals having arbitrary polarization into parallel light beams having a single linear polarization orientation;
- first and second arrays of independently controlled reflective beam steering elements, positioned in the optical path of the wavelength components after the polarization walk-off array, wherein each beam steering element of the first array is independently controlled to direct one of the wavelength components to a light combining element that combines the wavelength components from the first array of independently controlled beam steering elements into a plurality of output signals, and each beam steering element of the second array is independently controlled to direct one of the plurality of output signals to a selected one of the output ports, a wavelength component of the first optical signal and a wavelength component of the second optical signal are combinable to produce an output optical signal at a selected one of the output ports; and
- a polarization combining array disposed in the optical path of wavelength components directed by beam steering elements of the first and second array and configured to provide a controllable amount of polarization rotation to at least some wavelength components to provide a desired amount of signal attenuation in a corresponding wavelength component.

11. The optical device of claim 10, wherein the wavelength components of one of the optical signals transmitted through the input ports include a first wavelength component and a second wavelength component, and the first wavelength component and the second wavelength component are transmitted through different output ports.

12. The optical device of claim 10, wherein the beam steering elements are formed on a common substrate.

13. The optical device of claim 10, wherein the beam steering elements comprise a liquid-crystal on silicon (LCOS) phased array.

14. The optical device of claim 10, wherein attenuated signals are directed to a light dump.

15. The optical device of claim 10, further comprising a polarization convertor positioned in the optical path of the wavelength components before the polarization walk-off array, the polarization converter converting a polarization of at least one wavelength component to s-polarized.

16. The optical device of claim 10, wherein wavelength components are directed with "hitless" operation.

17. An optical device having multiple input and output ports, comprising:
- a light diffracting element positioned in an optical path of optical signals comprising a first optical signal transmitted through a first input port and a second optical signal transmitted through a second input port, the light diffracting element separating the optical signals into wavelength components;
- a polarization walk-off array comprising a birefringent walk-off plate and a reciprocal optical rotator positioned in the optical path of the wavelength components, the polarization walk-off array converting the optical signals having arbitrary polarization into parallel light beams having a single linear polarization orientation;
- first and second arrays of independently controlled liquid crystal beam steering elements positioned in the optical path of the wavelength components after the polarization walk-off array, each beam steering element of the first array being independently controlled to direct one of the wavelength components to a selected one of the beam steering elements of the second array, each beam steering element of the second array being independently controlled to direct the wavelength component incident thereon to a light combining side of the light diffracting element, a wavelength component of the first optical signal and a wavelength component of the second optical signal are combinable to produce an output optical signal at a selected one of the output ports; and
- a liquid crystal polarization combining array disposed in the optical path of wavelength components directed by beam steering elements of the first and second array and configured to provide a controllable amount of polarization rotation to at least some wavelength components to provide a desired amount of signal attenuation.

18. The optical device of claim 17, wherein the first and second arrays are angled with respect to each other.

19. The optical device of claim 17, wherein the first and second arrays are aligned and further comprising a reflecting element.

20. The optical device of claim 17, wherein the beam steering elements are formed on a common substrate.

21. The optical device of claim 17, further comprising a polarization convertor positioned in the optical path of the wavelength components before the polarization walk-off array, the polarization converter converting a polarization of at least one wavelength component to s-polarized.

22. The optical device of claim 17 wherein wavelength components are directed with "hitless" operation.

* * * * *